_United States Patent Office_

3,598,834
Patented Aug. 10, 1971

3,598,834
PROCESS FOR PRODUCING 3-AMINOISOXAZOLE
Katsura Morita, Ikeda, Osaka, Naoto Hashimoto, Suita, Osaka, and Koichi Matsumura, Ikuno-ku, Osaka, Japan, assignors to Takeda Chemical Industries, Ltd., Osaka, Japan
No Drawing. Filed Dec. 13, 1968, Ser. No. 783,741
Claims priority, application Japan, Dec. 13, 1967, 42/79,893
Int. Cl. C07d 85/22
U.S. Cl. 260—307        6 Claims

ABSTRACT OF THE DISCLOSURE 3-aminoisoxazole is produced by subjecting a novel alkylideneaminoxyacrylonitrile of the formula $$R=N-O-CH=CH-CN$$

wherein R=an alkylidene group having 2 to 8 carbon atoms to hydrolysis and ring-closure at a temperature of $-10°$ to $100°$ C. under acidic conditions in high yields and without being accompanied by any appreciable quantities of by-product.

---

This invention relates to a new and improved process for producing 3-aminoisoxazole and to the new intermediates for production thereof.

More concretely, the present invention is primarily concerned with a process for producing 3-aminoisoxazole by the hydrolysis of new alkylideneaminoxyacrylonitriles of the formula $$R=N-O-CH=CH-CN \qquad (I)$$

wherein R stands for an alkylidene group having two to eight carbon atoms. The present invention is also concerned with the new alkylideneaminoxyacrylonitriles of the above Formula I, and the process for producing thereof by reaction cyanoacetylene with an alkanone oxime of the formula $$R=N-OH \qquad (II)$$

wherein R has the same meaning as the above.

3-aminoisoxazole is useful as a starting material for production of 3-sulfanilamidoisoxazole having a wide and prolonged antimicrobial activity, which is known by Dutch patent application No. 6408919/1965. Though there are several known methods for producing 3-aminoisoxazole, including the method described in the above Dutch patent application, these methods afford low yields. For example, the method of the above Dutch patent application offers such a low yield as about 20% of the theoretical. When hydroxylamine is used as the starting material, the reaction is inevitably accompanied by the production of 5-aminoisoxazole which is presumed to be produced through the following reaction scheme:

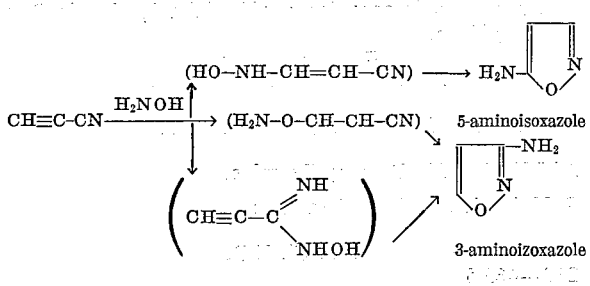

An object of this invention is to provide a process for producing 3-aminoisoxazole in high yields without being accompanied by any appreciable quantities of by-products.

Another object of this invention is to provide a new alkylideneaminoxyacrylonitrile which is useful as an intermediate for producing 3-aminoisoxazole.

Other objects and advantages of this invention will become apparent from the following description.

To realize said objects, the novel intermediate, alkylideneaminoxyacrylonitrile, of the Formula I is prepared by reacting cyanoacetylene with said alkanone oxime of the Formula II, and then the alkylideneaminoxyacrylonitrile is subjected to the hydrolysis under acid conditions, whereby there automatically takes place a ring-closure in the hydrolyzate to give 3-aminoisoxazole.

The processes of this invention can be represented by the following reaction scheme:

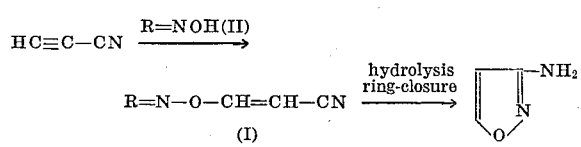

wherein R has the same meaning as the above.

The alkanone oximes to be employed in the present invention include, for example, aliphatic or alicyclic ketoximes containing two to eight carbon atoms such as acetoxime, methyl ethyl ketoxime, cyclopentanone oxime, cyclohexanone oxime, cycloheptanone oxime, etc. Among them, cyclohexanone oxime which is commercially available gives the most advantageous result in view of the yield of the product and the cost of the production thereof.

The reaction of cyanoacetylene with said alkanone oxime of the Formula II can be carried out in the presence of a suitable solvent, for example, methanol, ethanol, acetonitrile, acetone, dioxane, ether, benzene, dimethylformamide and the like, and the mixture thereof under cooling with ice or at room temperature of 0 to 40° C., under heating, if required. The reaction may likewise be conducted in the presence of such bases as sodium alcoholate, N-methylmorpholine, dimethylaniline, pyridine, quinoline, trimethylamine, alkali metal carbonate, alkali sulfoxide, etc. In this manner, alkylideneaminoxyacrylonitrile is obtained in a quantitative yield. The alkylideneaminoxyacrylonitrile is then subjected to the subsequent reaction either as it is or after being isolated, if necessary. This compound can be isolated in a substantially pure form by, for example, subjecting it to chromatography. The alkylideneaminoxyacrylonitrile produced as above is a novel compound. The results of such analysis as infrared absorption (IR), nuclear magnetic resonance (NMR) and other methods show that a greater part of the compound takes a cis-configuration which is suitable for producing 3-aminoisoxazole.

The hydrolysis and ring-closing reaction of alkylideneaminoxyacrylonitriles of the Formula I can be conducted under acid conditions, for example, in the presence of a mineral acid, e.g. hydrochloric acid or sulfuric acid, and at a temperature of about $-10°$ to $+100°$ C. The resulting 3-aminoisoxazole may be isolated from the reaction mixture by, for example, the extraction with an organic solvent under neutral or alkaline conditions.

3-aminoisoxazole obtained as above is in complete agreement in all aspects with a standard product synthesized by a different method.

As mentioned above, according to this invention, 3-aminoisoxazole can be obtained in a considerable yield, namely more than 80% of the theoretical. In particular when cyclohexane oxime is employed as a starting material, 3-aminoisoxazole can be produced economically.

The following examples are solely for the purpose of illustration and are not to be construed as limitations of this invention, many variations being possible without departing from the spirit or scope of this invention.

The relationship between part(s) by weight and part(s) by volume is the same as that between gram(s) and milliliter(s).

EXAMPLE 1

(a) 0.020 part by weight of N-methylmorpholine is added to a solution of 1.07 part by weight of cyanoacetylene and 2.26 parts by weight of cyclohexanone oxime in 50 parts by volume of ethanol, and the mixture is stirred, first under cooling with ice for one hour, and then, at room temperature overnight. The solvent is evaporated to yield 3.41 parts by weight brown oil. The oil is chromatographed with silica gel using chloroform as an eluant, whereupon 3.1 parts by weight of a colorless oily substance are obtained. The oily substance crystallyzes on standing at room temperature to give cis-β-cyclohexylideneaminoxyacrylonitrile. Yield 96.5% of the theoretical. This product is identified from the data given below.

Melting point: 48–50° C.
Infrared absorption: (nujol) V (cm.¹)
    3080, 2220, 1650, 1615, 1115, 959, 915, 875, 723
Nuclear magnetic resonance (CDCl$_3$)δ (p.p.m.):
    1.70 (6H) (broad), 2.25 (2H) (broad), 2.65 (2H) (broad)
    4.37 (1H) (d) (J=6.8 cps.),
    7.47 (1H) (d) (J=6.8 cps.)

Elemental analysis.—Calcd. for $C_9H_{12}ON_2$ (percent): C, 65.83; H, 7.37; N, 17.06. Found (percent): C, 65.90; H, 7.41; N, 17.01.

(b) In 150 parts by volume of ether containing 1 ml. of water is dissolved 1.64 parts by weight of cis-β-cyclohexylideneaminoxyacrylonitrile. Dry hydrogen chloride gas is bubbled into the solution until saturation is attained. The solution is then allowed to stand overnight. The ether is removed under reduced pressure, and 5 parts by volume of water are added to the residue. While cooling, the solution is made alkaline with potassium carbonate. Then, the solution is extracted with 200 parts by volume of ethyl acetate, and the extract is washed with water. After drying, the solvent is distilled whereupon 1.49 part by weight of an oily substance is obtained. When this oily product is column-chromatographed with silica gel using chloroform-ethanol as an eluant, 0.713 part by weight of 3-aminoisoxazole is obtained. Yield 85% of the theoretical. The obtained 3-aminoisoxazole is in agreement with an authentic sample in all aspects.

EXAMPLE 2

(a) 1.07 part by weight of cyanoacetylene in 2 parts by volume of ethanol is added, over 30 minutes, to a solution of 1.46 part by weight of acetone oxime and 20 part by weight of N-methylmorpholine in 20 parts by volume of ethanol under stirring and cooling with ice. The mixture is stirred, first under cooling for 2 hours, and then, at room temperature overnight. The solvent is distilled out to leave 2.60 parts by weight of oil. The oil is chromatographed with silica gel using chloroform as an eluant to yield 2.30 parts by weight of an oily substance. The oily substance crystallizes on standing at room temperature to give cis - β-isopropylideneaminoxyacrylonitrile. Yield 93.0% of the theoretical. This product is identified from the data given below.

Melting point: 38–40° C.
Infrared absortpion: (nujol) V (cm.⁻¹)
    3080, 2215, 1668, 1650, 1620, 1117, 964, 890, 737
Nuclear magnetic resonance (CDCl$_3$)δ (p.p.m.):
    1.95 (3H) (S)
    2.04 (3H) (S)
    4.39 (1H) (d) (J=7.0 cps.).
    7.45 (1H) (d) (J=7.0 cps.).

Elemental analysis.—$C_6H_8ON_2$ (percent): C, 58.05; H, 6.50; N, 22.57. Found (percent): C, 58.01; H, 6.40; N, 22.68.

(b) To 1.24 part by weight of cis-β-isopropylideneaminoxyacrylonitrile in 50 parts by volume of benzene is added 4 parts by volume of 20% hydrochloric acid, and the mixture is stirred for 10 hours at room temperature. The aqueous layer is separated from the benzene layer, and the benzene layer is washed with a small amount of water. The washing is combined with the above aqueous layer. While cooling, the aqueous solution is made alkaline with sodium hydroxide. Then the solution is extracted with 300 parts by volume of ethyl acetate, and the extract is dried and distilled whereupon 0.82 part by weight of oil is obtained. When the oil is chromatographed with silica gel using chloroform-ethanol as an eluant, 0.722 part by weight of 3-aminoisoxazole is obtained. Yield 86% of the theoretical. The obtained 3-aminoisoxazole is in agreement with an authentic sample in all aspects.

What is claimed is:
1. A process for producing 3-aminoisoxazole, which comprises subjecting an alkylideneaminoxyacrylonitrile of the formula

R=N—O—CH=CH—CN wherein R stands for an alkylidene group having two to eight carbon atoms to hydrolysis and ring-closure reaction at a temperature of about −10° to 100° C. under acidic conditions.

2. A process for producing 3-aminoisoxazole, which comprises reacting cyanoacetylene with an alkanone oxime of the formula

R=NOH wherein R stands for an alkylidene group having two to eight carbon atoms in the presence of base, and subjecting the resultant product of the formula

R=N—O—CH=CH—CN wherein R has the same meaning as the above to hydrolysis and ring-closure reaction at a temperature of about −10° to 100° C. under acidic conditions.

3. A process in accordance with claim 1, wherein R is cyclohexylidene.

4. A process in accordance with claim 1, wherein R is isopropylidene.

5. A process in accordance with claim 2, wherein R is cyclohexylidene.

6. A process in accordance with claim 2, wherein R is isopropylidene.

References Cited

UNITED STATES PATENTS 3,435,047  3/1969  Iwai et al. _____ 260—307

ALEX MAZEL, Primary Examiner

R. V. RUSH, Assistant Examiner

U.S. Cl. X.R.
260—465.5